United States Patent
Vegas Olmos et al.

(10) Patent No.: US 11,658,796 B2
(45) Date of Patent: May 23, 2023

(54) END-TO-END LINK CHANNEL WITH LOOKUP TABLE(S) FOR EQUALIZATION

(71) Applicant: Mellanox Technologies, Ltd., Yokneam (IL)

(72) Inventors: Juan Jose Vegas Olmos, Solrod Strand (DK); Elad Mentovich, Tel Aviv (IL); Liran Liss, Misgav Am (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/231,747

(22) Filed: Apr. 15, 2021

(65) Prior Publication Data
US 2022/0337386 A1 Oct. 20, 2022

(51) Int. Cl.
| | |
|---|---|
| *H04L 7/00* | (2006.01) |
| *H04B 10/40* | (2013.01) |
| *H04B 10/69* | (2013.01) |
| *H04L 25/03* | (2006.01) |

(52) U.S. Cl.
CPC ........... *H04L 7/0029* (2013.01); *H04B 10/40* (2013.01); *H04B 10/6971* (2013.01); *H04L 25/03885* (2013.01)

(58) Field of Classification Search
CPC .................. H04L 7/0066; H04L 7/0075; H04L 25/03885; H04B 10/40; H04B 10/6971
USPC .......................................... 375/219–222, 232
See application file for complete search history.

(56) References Cited

U.S. PATENT DOCUMENTS

| | | | |
|---|---|---|---|
| 8,965,209 B2* | 2/2015 | Goodson | H04B 10/272 |
| | | | 398/43 |
| 9,712,349 B1* | 7/2017 | Lu | H04L 5/006 |
| 11,128,497 B1* | 9/2021 | Sun | H04L 25/03267 |
| 2004/0246613 A1* | 12/2004 | Tseng | H03K 7/02 |
| | | | 360/1 |
| 2014/0010546 A1* | 1/2014 | Chaahoub | G06F 13/00 |
| | | | 398/116 |
| 2017/0288779 A1* | 10/2017 | Tatum | H04B 10/25073 |
| 2018/0234177 A1* | 8/2018 | Li | H04B 10/40 |
| 2022/0239071 A1* | 7/2022 | Septon | H01S 5/423 |

FOREIGN PATENT DOCUMENTS

EP        2768175 A1 *  8/2014  ............. H04L 1/201

\* cited by examiner

*Primary Examiner* — Emmanuel Bayard
(74) *Attorney, Agent, or Firm* — Moore & Van Allen PLLC; Anup Shrinivasan Iyer

(57) ABSTRACT

Embodiments are disclosed for facilitating an end-to-end link channel with one or more lookup tables for equalization. An example system includes a first transceiver and a second transceiver. The first transceiver includes a clock data recovery (CDR) circuit configured to receive communication data from a switch and to manage a lookup table associated with equalization of the communication data. The first transceiver also includes a first driver circuit communicatively coupled to the CDR circuit and configured to generate an electrical signal associated with the communication data. The second transceiver includes a second driver circuit, communicatively coupled to the first transceiver, that is configured to receive the electrical signal from the first transceiver and to modulate a laser source based on the electrical signal to generate an optical signal via the laser source.

20 Claims, 8 Drawing Sheets

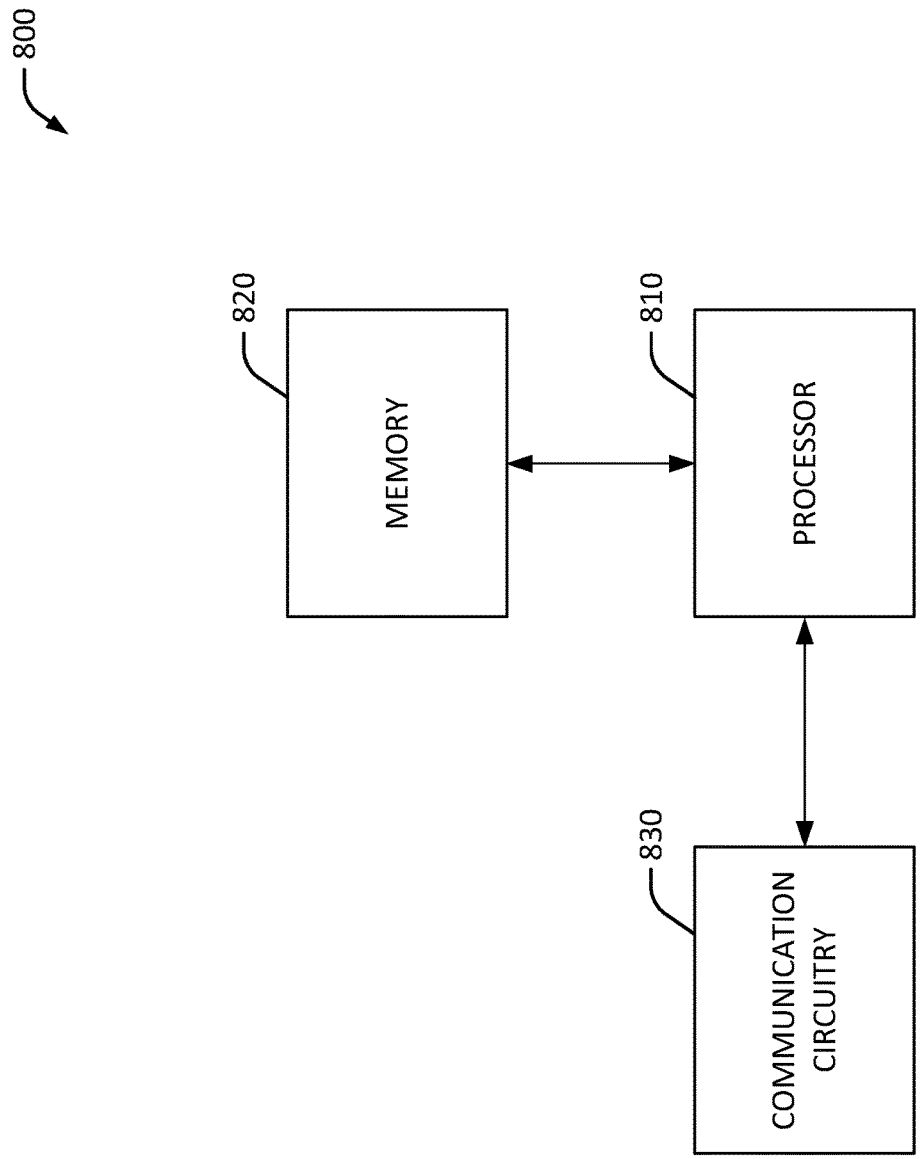

END-TO-END LINK CHANNEL WITH LOOKUP TABLE(S) FOR EQUALIZATION

TECHNOLOGICAL FIELD

Embodiments of the present invention relate generally to equalization for an end-to-end link channel of a computer network system.

BACKGROUND

Computer network systems (e.g., datacenter infrastructures) are being developed to sustain increased demand for technologies related to communication systems (e.g., 5G communication systems), internet of things (IoT), artificial intelligence (AI), etc. However, increased performance of a computer network system generally results in increased power consumption by the computer network system. As such, it is desirable to reduce power consumption while also increasing performance of a computer network system.

BRIEF SUMMARY

Example embodiments of the present invention relate generally to system(s), method(s) and apparatus that provide an end-to-end link channel with lookup table(s) for equalization related to a computer network system. The details of some embodiments of the subject matter described in this specification are set forth in the accompanying drawings and the description below. Other features, aspects, and advantages of the subject matter will become apparent from the description, the drawings, and the claims.

In an embodiment, a system includes a first transceiver and a second transceiver. The first transceiver comprises a clock data recovery (CDR) circuit and a first driver circuit. The CDR circuit is configured to receive communication data from a switch and to manage a lookup table associated with equalization of the communication data. The first driver circuit is communicatively coupled to the CDR circuit and is configured to generate an electrical signal associated with the communication data. The second transceiver comprises a second driver circuit. The second driver circuit is communicatively coupled to the first transceiver. Furthermore, the second driver circuit is configured to receive the electrical signal from the first transceiver and to modulate a laser source based on the electrical signal to generate an optical signal via the laser source.

In some embodiments, the CDR circuit is configured to adjust the lookup table for pre-equalization of the communication data. In some embodiments, the CDR circuit is configured to adjust the lookup table to implement feed-forward equalization of the communication data. In some embodiments, the CDR circuit is configured to tune one or more feed-forward equalizer coefficients configured by the lookup table. In some embodiments, the lookup table is embedded in the CDR circuit. In some embodiments, the second transceiver is attached to a front panel of the switch. In some embodiments, the laser source is a vertical cavity surface emitting laser. In some embodiments, the laser source is an externally modulated laser.

In another embodiment, a system includes a first transceiver and a second transceiver. The first transceiver comprises a photodiode configured to generate an electrical signal based on an optical signal. The second transceiver comprises a driver circuit and a CDR circuit. The driver circuit is communicatively coupled to the first transceiver and is configured to receive the electrical signal from the first transceiver and to generate a modified electrical signal based on the electrical signal. The CDR circuit is configured to generate communication data based on the modified electrical signal and to manage a lookup table associated with equalization of the communication data.

In some embodiments, the CDR circuit is configured to adjust the lookup table for post-equalization of the communication data. In some embodiments, the CDR circuit is configured to adjust the lookup table to implement feed-forward equalization of the communication data. In some embodiments, the CDR circuit is configured to tune one or more feed-forward equalizer coefficients configured by the lookup table. In some embodiments, the lookup table is embedded in the CDR circuit. In some embodiments, the CDR circuit is configured to provide the communication data to a switch. In some embodiments, the CDR circuit is configured to store the communication data in a memory. In some embodiments, the CDR circuit is configured to provide the communication data to a processing unit. In some embodiments, the first transceiver comprises a transimpedance amplifier (TIA). In some embodiments, the TIA is configured to modify the electrical signal provided by the photodiode. In some embodiments, the TIA is communicatively coupled to the second transceiver.

In yet another embodiment, a method is provided for performing, via a first CDR circuit of a first transceiver, a first equalization process with respect to communication data. The method also provides for transmitting the communication data via an optical communication lane. Furthermore, the method provides for performing, via a second CDR circuit of a second transceiver, a second equalization process with respect to the communication data.

In some embodiments, performing the first equalization process comprises performing pre-equalization of the communication data prior to the transmitting of the communication data via the optical communication lane. In some embodiments, performing the second equalization process comprises performing post-equalization of the communication data after transmitting of the communication data via the optical communication lane.

The above summary is provided merely for purposes of summarizing some example embodiments to provide a basic understanding of some aspects of the present invention. Accordingly, it will be appreciated that the above-described embodiments are merely examples and should not be construed to narrow the scope or spirit of the present invention in any way. It will be appreciated that the scope of the present invention encompasses many potential embodiments in addition to those here summarized, some of which will be further described below.

BRIEF DESCRIPTION OF THE DRAWINGS

Figure 1:
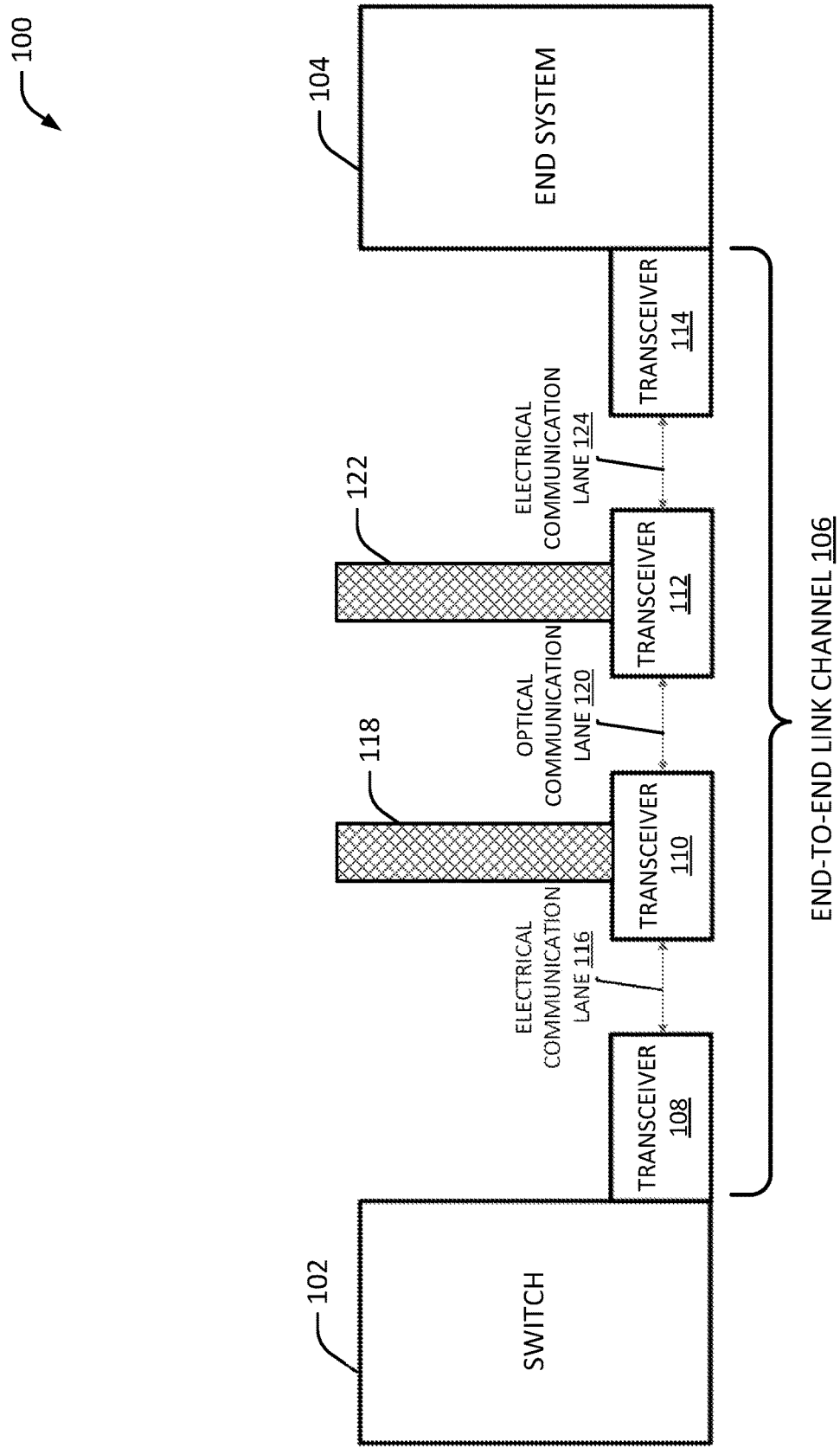
Figure 2:
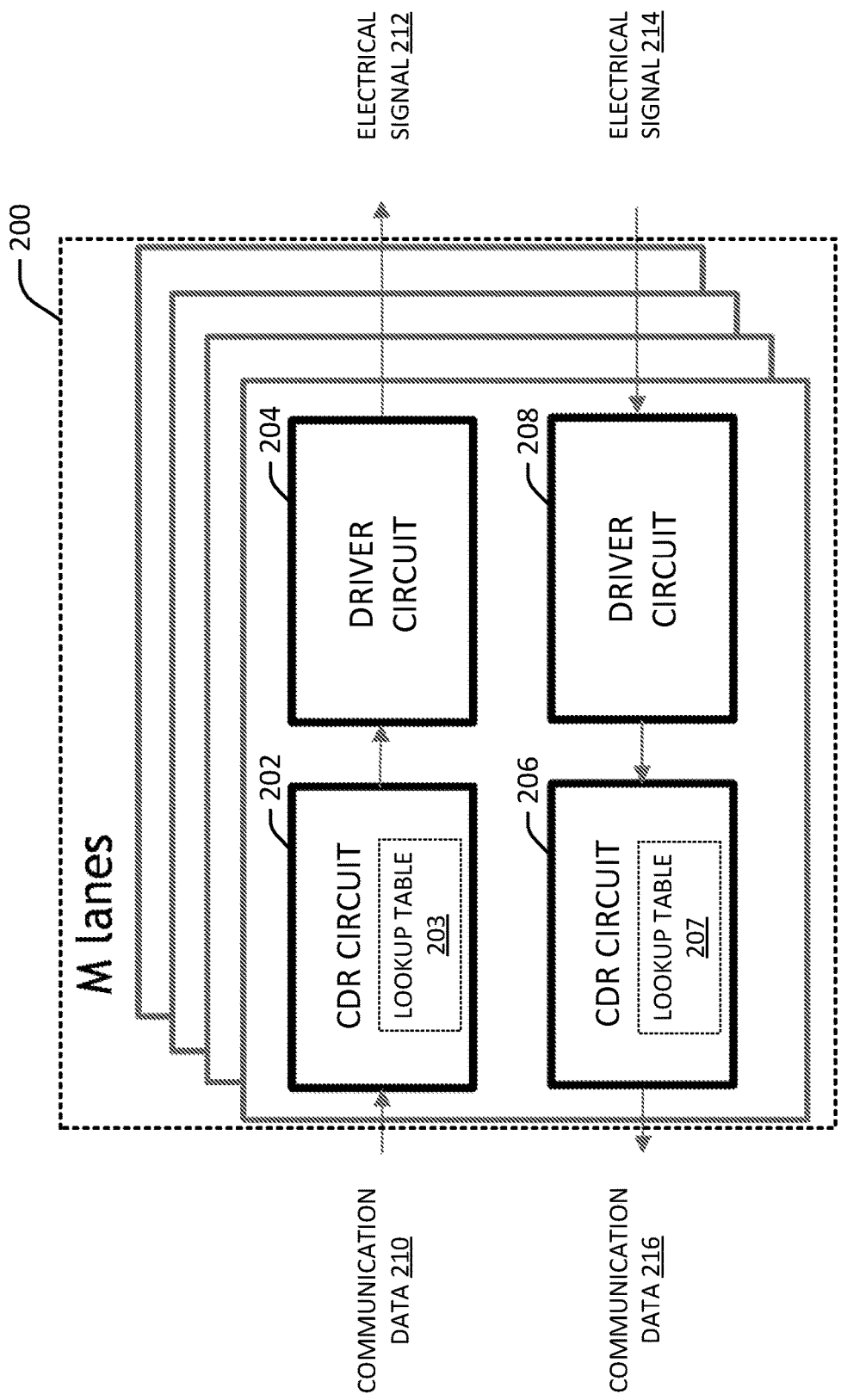
Figure 3:
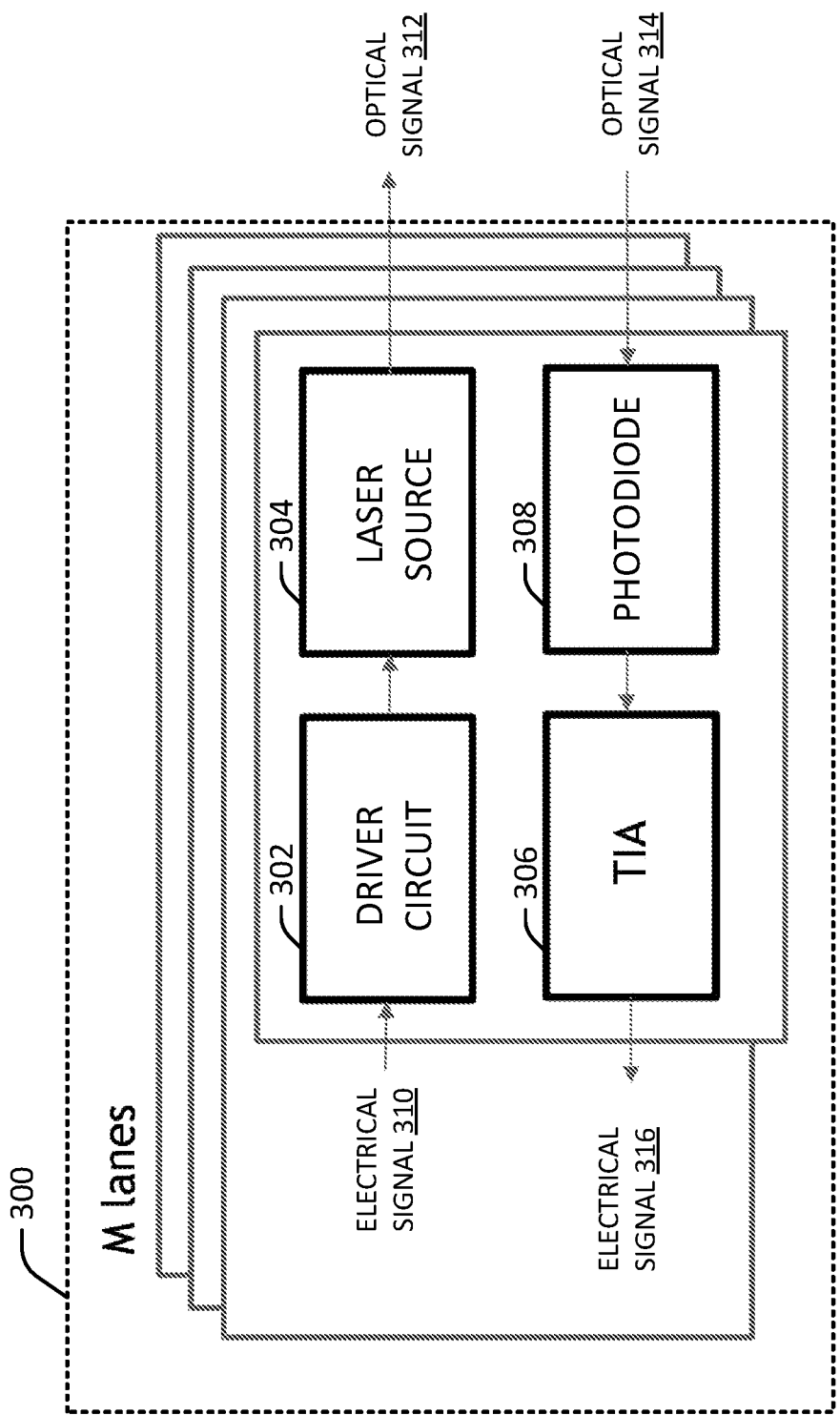
Figure 4:
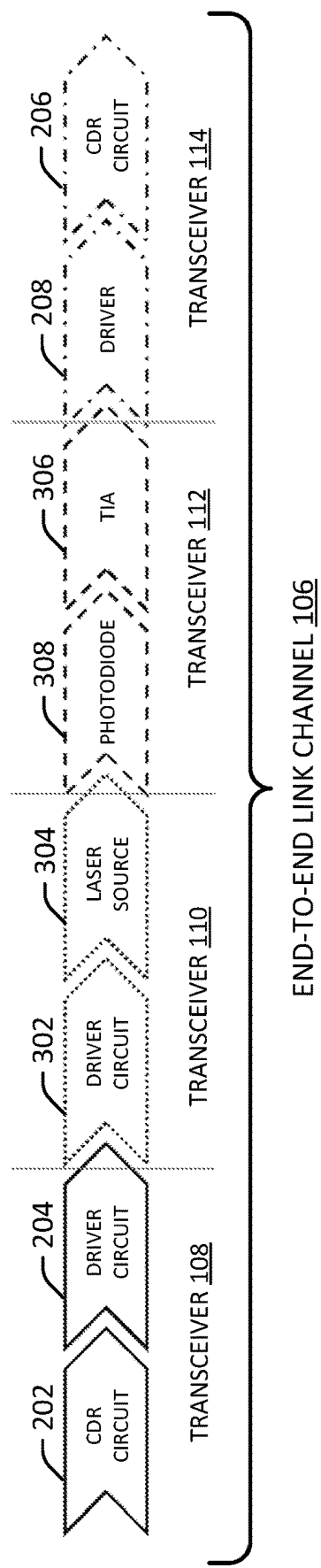
Figure 5:
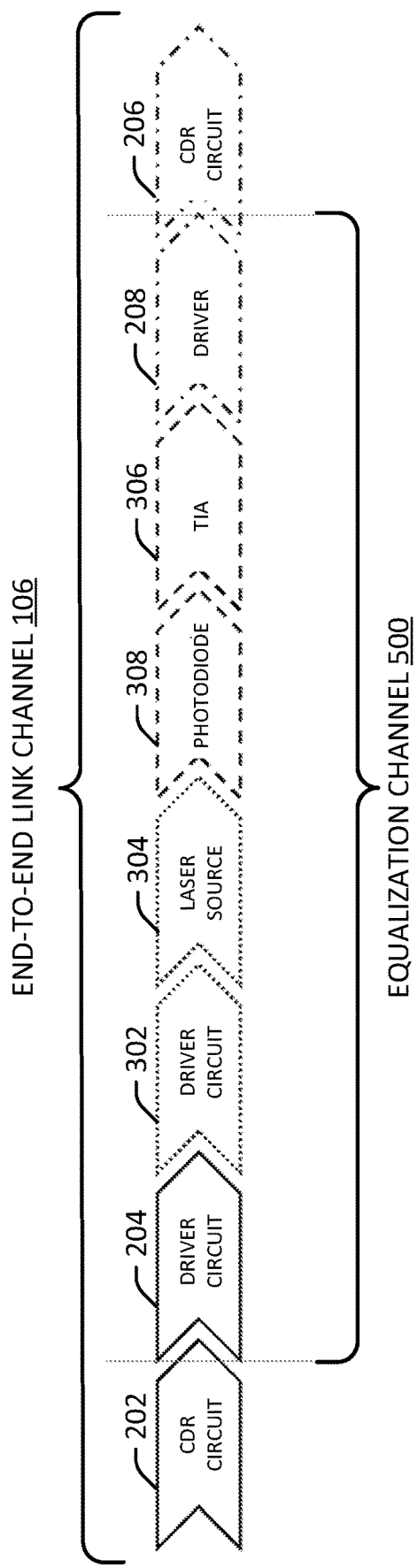
Figure 6:
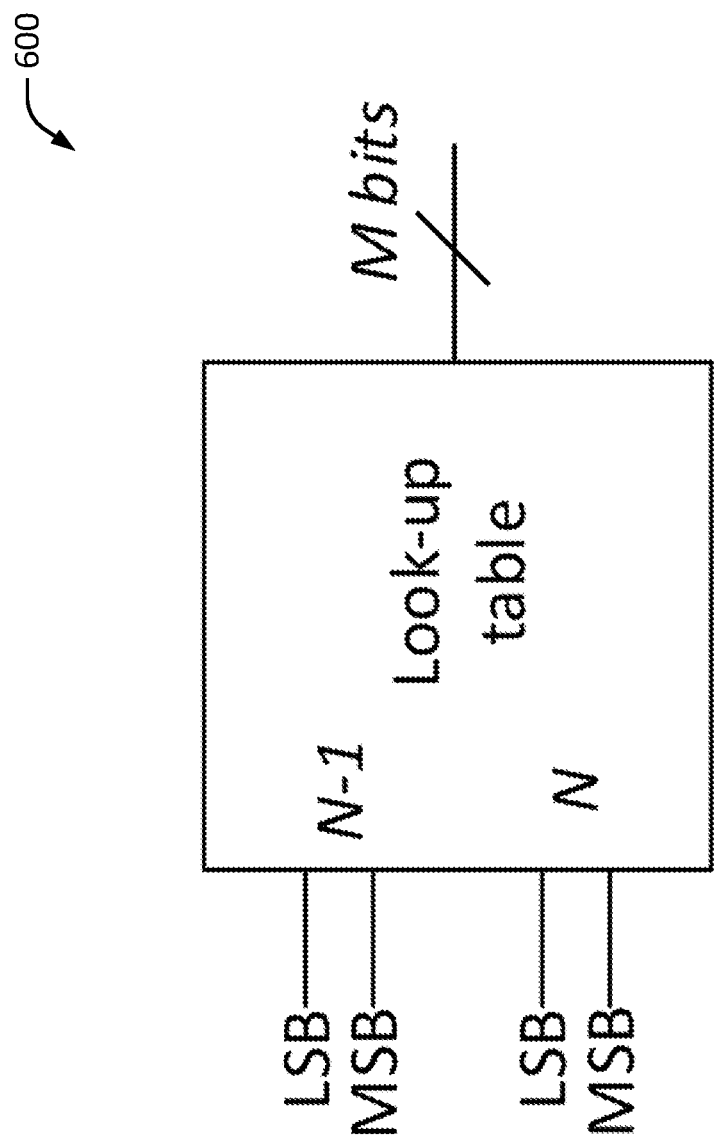
Figure 7:
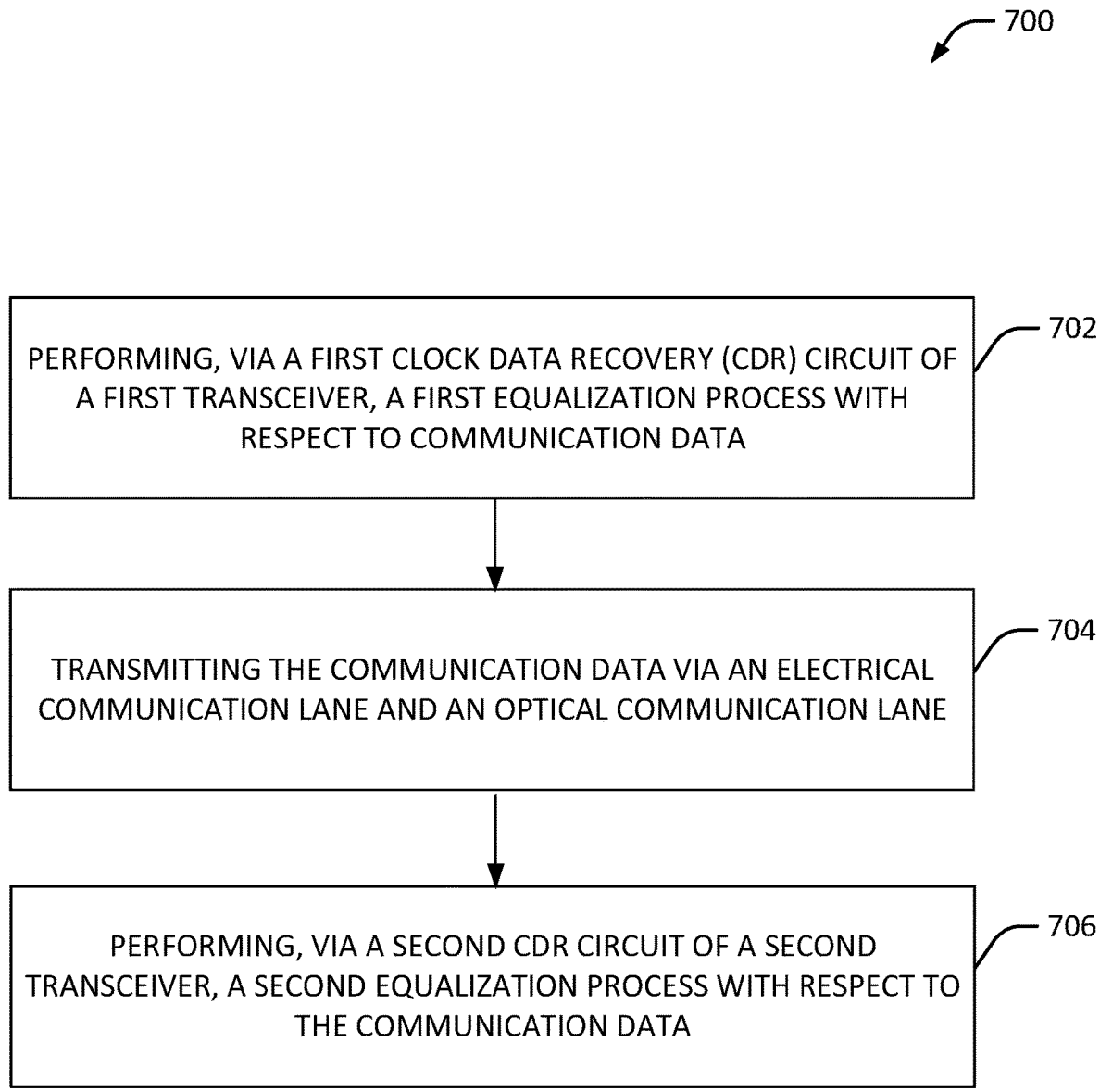

Having thus described the disclosure in general terms, reference will now be made to the accompanying drawings, which are not necessarily drawn to scale, and wherein:

FIG. 1 illustrates an example computer network system employing an end-to-end link channel in accordance with one or more embodiments of the present disclosure;

FIG. 2 illustrates an example transceiver, in accordance with one or more embodiments of the present disclosure;

FIG. 3 illustrates another example transceiver, in accordance with one or more embodiments of the present disclosure;

FIG. 4 illustrates an example end-to-end link channel, in accordance with one or more embodiments of the present disclosure;

FIG. 5 illustrates an example equalization channel, in accordance with one or more embodiments of the present disclosure;

FIG. 6 illustrates an example lookup table, in accordance with one or more embodiments of the present disclosure;

FIG. 7 is a flowchart illustrating an example method for facilitating an end-to-end link channel with one or more lookup tables for equalization, in accordance with one or more embodiments of the present disclosure; and FIG. 8 illustrates an example computing system that may be embedded in the communication system, in accordance with one or more embodiments of the present disclosure.

DETAILED DESCRIPTION

Example embodiments will now be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "exemplary" and "example" as may be used herein are not provided to convey any qualitative assessment, but instead merely to convey an illustration of an example. Thus, use of any such terms should not be taken to limit the spirit and scope of embodiments of the present invention.

The field of high-performance computing (HPC) and data center (DC) communications continuously experiences a tremendous growing demand for high capacity, low latency, low power consumption, and a small footprint of interconnects. Various applications, such as HPC clustering, communications (e.g., 5G communications, etc.), internet of things (IoT), artificial intelligence (AI), deep learning, cloud computing, computer data storage, graphics processing units (GPUs), parallel processing, mobile systems, etc. all benefit from high capacity, low latency, low power consumption, and a small footprint of interconnects.

Performance of an HPC or DC system is generally measured through different parameters, such as, but not limited to, processing performance, operations per second, footprint, power consumption, etc. In particular, power consumption is typically very relevant to performance of an HPC or DC system. However, numerous technological aspects generally need to be considered for power consumption. For example, power consumption of pluggable devices is generally limited by technical standards. Hence, when designing new pluggable devices, power consumption is generally a high priority design factor. Furthermore, when configuring an HPC or DC system for certain data rates such as, for example, 14G, 28G, 50G, 100G or 200G, more power is generally required to sufficiently supply power to components of the HPC or DC system.

Additionally, modulation formats have also evolved, and HPC or DC system have generally adopted pulse amplitude modulation (PAM)-4 as a common modulation technique. For example, PAM-4 offers twice the capacity compared to non-return to zero (NRZ) at approximately the same bandwidth. However, PAM-4 also generally requires a complex underlying system architecture. For example, with NRZ links, a receiver may have two slicers to determine the levels received. In this regard, a first slicer can be configured as a main discerner and a second slicer can be configured to monitor signals, generate bit-error rate profiles, determine whether any changes are needed with respect to the first slicer, etc. In a PAM-4 system, four slices are generally employed. For example, with a PAM-4 system, there may be one primary slicer for each level and a fourth one for monitoring. Therefore, PAM-4 generally results in more complex underlying silicon and additional power consumption as compared to NRZ.

In an HPC or DC system, an end-to-end link channel may be composed of different processing blocks such as one or more laser sources, one or more photodiodes, one or more transimpedance amplifiers, one or more modulator drivers, one or more bond wires connections, one or more optical fiber connections, etc. To ensure an acceptable signal integrity in an end-to-end link, the systems need to make sure distortions of the signal caused by the channel are properly compensated, such as by implementing equalization at the receiver or the transmitter, or by implementing precoding at the transmitter.

Equalization may be implemented through feed-forward equalizers (FFE). FFEs are typically implemented using digital finite impulse response (FIR) filters. FIR filters generally have pre-cursor and post-cursor taps, each with a different weight, which match the inverse of the impulse response of the end-to-end link, thereby effectively equalizing signals transmitted over such a link. FFE equalizers can be placed at the transmitter, the receiver, or both sides simultaneously. Alternatively, decision-feedback equalizers (DFE) may be placed at the receiver to equalize for post-cursor interference. A DFE takes a sample of the current recovered bit, applies the inverse of the channel transfer function, estimating the amount of post-cursor interference, and subtracts that amount from the incoming signal, thereby allowing a proper recovery of the next bit.

Currently, network components such as switches are connected to components through optical pluggable devices. For example, a switch (or end-system) can be connected to a front panel through a first transceiver. Because the connection from the switch to the front panel is generally based on electrical lanes, optical lanes are generally not employed between the switch and the front panel. Furthermore, between front panels, a connection that contains an optical-to-electrical chain and an electrical-to-optical chain is generally employed. The optical-to-electrical chain and/or the electrical-to-optical chain generally includes numerous clock data recovery (CDR) circuits (e.g., CDR circuits in multiple transceivers in the optical-to-electrical chain and/or the electrical-to-optical chain) configured for equalization of a signal, re-timing of a signal and/or amplitude adjustment of a signal. However, employing numerous CDR circuits can be expensive in terms of footprint, latency, and power consumption. Furthermore, employing numerous CDR circuits generally results in an increased footprint, increased latency, and/or increased power consumption for certain higher order signaling channels such as PAM-4 signaling channels or higher order signaling channels.

Thus, to address these and/or other issues, an end-to-end link channel with one or more lookup tables for equalization is disclosed herein. In one or more embodiments, power consumption of a computer network system can be reduced by optimizing location of one or more processing blocks in an end-to-end link channel. For example, in an embodiment, power consumption of a computer network system can be reduced by optimizing the location of one or more CDR circuits in an end-to-end link channel. In one or more embodiments, equalization can be implemented at a beginning and an end of an end-to-end link channel (e.g., rather than at each interface of an end-to-end link channel). In one or more embodiments, by optimizing the location of one or more CDR circuits in an end-to-end link channel, the equalization capabilities of a transceiver can be increased to provide an end-to-end regeneration free link for a computer network system. In one or more embodiments, an equalizer of the one or more CDR circuits can be based on a lookup table configured to equalize linear and/or non-linear features of data transmitted via the end-to-end link channel. In one or more embodiments, a lookup table of the one or more CDR circuits can be reconfigured during real-time operation of the computer network system.

FIG. 1 illustrates a system 100 that provides an end-to-end link channel with one or more lookup tables for equalization according to one or more embodiments of the present disclosure. In one or more embodiments, the system 100 is a computer network system. For example, the system 100 can be an HPC system. In another example, the system 100 can be a DC system. The system 100 includes a switch 102 and an end system 104. The switch 102 can be a network switch such as, for example, an Ethernet switch, an Infini-Band switch or another type of network switch. In an embodiment, the end system 104 can be another switch (e.g., another network switch). In another embodiment, the end system 104 can be a memory. In yet another embodiment, the end system 104 can be a processing unit such as a central processing unit, a graphics processing unit or another type of processing unit.

The system 100 also includes an end-to-end link channel 106 between the switch 102 and the end system 104. In one or more embodiments, the end-to-end link channel 106 includes a transceiver 108, a transceiver 110, a transceiver 112, and a transceiver 114. In an embodiment, the transceiver 108 and the transceiver 114 can be configured as a first type of transceiver. Furthermore, the transceiver 110 and the transceiver 112 can be configured as a second type of transceiver. For example, in an embodiment, the transceiver 108 and the transceiver 114 can be configured with the same type and/or number of processing blocks. Furthermore, the transceiver 110 and the transceiver 112 can be configured with the same type and/or number of processing blocks, where the processing blocks of the transceiver 110 and the transceiver 112 are different than the processing blocks of the transceiver 108 and the transceiver 114. In one or more embodiments, the processing blocks of the transceiver 108 and the transceiver 114 include a first CDR circuit with an embedded lookup table, a driver, a transimpedance amplifier (TIA), and/or a second CDR circuit with a different embedded lookup table. In one or more embodiments, the processing blocks of the transceiver 110 and the transceiver 112 can include a driver, a laser source, a photodiode, and/or a TIA.

The transceiver 108 can be communicatively coupled to the switch 102. In an embodiment, the transceiver 108 can be a pluggable transceiver that is configured to attach to and detach from one or more ports of the switch 102. In another embodiment, the transceiver 108 can be integrated into the switch 102. In another embodiment, the transceiver 108 can be integrated into a circuit board of the switch 102. In one or more embodiments, the transceiver 108 can be configured to receive communication data from the switch 102 for transmission to the end system 104 via the end-to-end link channel 106. The transceiver 108 can also be communicatively coupled to the transceiver 110 via an electrical communication lane 116. In certain embodiments, the transceiver 110 can be attached to a front panel 118 of the switch 102. In an embodiment, the transceiver 110 can be integrated into the front panel 118. In another embodiment, the transceiver 110 can be integrated into a circuit board of the front panel 118. In certain embodiments, the transceiver 108 and/or the transceiver 110 can be attached to an integrated circuit apparatus of the front panel switch 102 via one or more removable connections. However, it is to be appreciated that, in certain embodiments, the transceiver 108 and/or the transceiver 110 can be implemented in a different configuration with respect to the switch 102 and/or the front panel 118. The transceiver 110 can be communicatively coupled to the transceiver 112 via an optical communication lane 120. In certain embodiments, the transceiver 112 can be attached to a front panel 122 of the end system 104. The transceiver 112 can be communicatively coupled to the transceiver 114 via an electrical communication lane 124. Furthermore, the transceiver 114 can be communicatively coupled to the end system 104.

FIG. 2 illustrates a block diagram of an example transceiver 200 according to one or more embodiments of the present disclosure. The transceiver 200 can correspond to the transceiver 108 and/or the transceiver 114. The transceiver 200 includes a CDR circuit 202, a driver circuit 204, a CDR circuit 206, and/or a driver 208. In certain embodiments, the transceiver 200 can be configured for M lanes, where M is an integer. Furthermore, each lane of the transceiver 200 can include and/or can be configured to employ the CDR circuit 202, the driver circuit 204, the CDR circuit 206, and/or the driver 208. In certain embodiments, the transceiver 200 can additionally include one or more amplification blocks within and/or between the CDR circuit 202, the driver circuit 204, the CDR circuit 206, and/or the driver 208. In certain embodiments, the one or more amplification blocks can be configured to adjust a voltage level of a signal to a certain voltage level to facilitate processing by the CDR circuit 202, the driver circuit 204, the CDR circuit 206, and/or the driver 208.

The CDR circuit 202 can be configured for equalization, re-timing, and/or amplitude adjustment of communication data 210. In some embodiments, the communication data 210 can be a digit signal comprising one or more bits. The communication data 210 can be a binary stream of data. Furthermore, in one or more embodiments, the communication data 210 can be a modulation signal. For example, in an embodiment, the communication data 210 can be a pulse amplitude modulation 4 (PAM-4) signal. In another embodiment, the communication data 210 can be a PAM-8 signal. In another embodiment, the communication data 210 can be a PAM-N signal, where N is an integer. In another embodiment, the communication data 210 can be an NRZ signal. In another embodiment, the communication data 210 can be a polybinary signal. In another embodiment, the communication data 210 can be a duobinary signal. However, it is to be appreciated that, in certain embodiments, the communication data 210 can be configured as a different type of signal. In one or more embodiments, the CDR circuit 202 can perform equalization of the communication data 210 based on a lookup table 203 configured to equalize linear and/or non-linear features of the communication data 210. Furthermore, in one or more embodiments, the CDR circuit 202 can be configured to manage the lookup table 203 associated with equalization of the communication data 210. For example, in certain embodiments, the CDR circuit 202 can be configured to adjust the lookup table 203 for pre-equalization of the communication data 210 (e.g., prior to the communication data 210 being transmitted via an optical communication lane). In another example, in certain embodiments, the CDR circuit 202 can be configured to adjust the lookup table 203 to implement feed-forward equalization of the communication data 210. In certain embodiments, the CDR circuit 202 can be configured to tune one or more feed-forward equalizer coefficients configured by the lookup table 203. In one or more embodiments, the lookup table 203 is embedded in the CDR circuit 202.

In one or more embodiments, the CDR circuit 202 can be configured to equalize from the switch 102 to the end system 104. For example, in one or more embodiments, the CDR circuit 202 can be configured with a transfer function (e.g., a channel transfer function) to equalize the end-to-end link channel 106 from the switch 102 to the end system 104. In one or more embodiments, the CDR circuit 202 can be configured for pre-equalization of the end-to-end link channel 106 from the switch 102 to the end system 104. In certain embodiments, a degree of pre-equalization provided by the CDR circuit 202 can be determined based on configuration of a tuning mechanism of the CDR circuit 202. Additionally or alternatively, in certain embodiments, a degree of pre-equalization provided by the CDR circuit 202 can be determined based on the lookup table 203 (e.g., a number of taps of the lookup table 203, a number of pre-taps of the lookup table 203, a number of post-taps of the lookup table 203, etc.).

In some embodiments, the CDR circuit 202 can be configured to calibrate the lookup table 203. The lookup table 203 can be configured to map one or more input values to an output value. In some embodiments, the lookup table 203 is a hardware-based lookup table circuit embedded in the CDR circuit 202 and controlled by the CDR circuit 202. For example, the lookup table 203 can include one or more hardware gates, one or more hardware latches, one or more hardware relays, and/or one or more other hardware components. In an embodiment, the CDR circuit 202 can tune one or more transitions of the lookup table 203. A transition of the lookup table 203 can include an initial state and an end state. Additionally, in certain embodiments, hardware components of the lookup table 203 can be associated with corresponding transitions. For example, in certain embodiments, a transition of the lookup table 203 can include one or more interconnections and/or one or more hardware components. In another embodiment, a weight of one or more hardware components of the lookup table 203 can be tuned by the CDR circuit 202. In certain embodiments, a weight of one or more hardware components of the lookup table 202 can be repeatedly tuned until the communication data 210 satisfies a defined quality criterion. For example, in certain embodiments, a weight of one or more hardware components of the lookup table 202 can be repeatedly tuned until the communication data 210 satisfies a defined optical communication quality metric.

In some embodiments, the CDR circuit 202 and/or the driver circuit 204 can utilize the lookup table 203 to generate the electrical signal 212. In some embodiments, the lookup table 203 may be configured to only perform equalization. For example, in some embodiments, the lookup table 203 may also be configured to take into account equalization of the communication data 210 (such as by having the lookup table values adjusted to take equalization into account). In some embodiments related to equalization, an input value of the lookup table 203 can be weighted to match a desired output value that contains an equalization factor. The lookup table 203 may additionally or alternatively, in some cases, be used to implement different coding, such as Costa precoding, Tomlinson-Harashima precoding, Gray coding, or the like. In some embodiments, one or more signal parameters of the communication data 210, such as a symbol duration, an amplitude, or other signal parameters, are adjusted based on the lookup table 203. In another embodiment related to coding, an input value of the lookup table 203 can be weighted based on a digital value associated with the coding. For example, in certain embodiments, an input value of the lookup table 203 can be weighted based on a digital value associated with Costa precoding, a digital value associated with Tomlinson-Harashima precoding, or a digital value associated with Gray coding.

The driver circuit 204 can be configured to convert the communication data 210 into an electrical signal 212 for transmission via an electrical communication lane (e.g., the electrical communication lane 116 or the electrical communication lane 124). For example, the driver circuit 204 can be communicatively coupled to the CDR circuit 202. Furthermore, the driver circuit 204 can be configured to generate the electrical signal 212 associated with the communication data 210. In certain embodiments, the driver circuit 204 can be configured to generate a differential output voltage and/or an amplified output voltage based on the communication data 210 to facilitate transmission of the electrical signal 212 and/or to facilitate modulation of a light source via the end-to-end link channel 106. For example, in certain embodiments, the driver circuit 204 can be a differential driver circuit. In another example, the driver circuit 204 can be an amplifier circuit (e.g., a single-ended amplifier circuit). In an embodiment where the transceiver 200 corresponds to the transceiver 108, the communication data 210 can be provided by the switch 102. Furthermore, in this embodiment, the electrical signal 212 can be transmitted via the electrical communication lane 116.

The driver 208 can be configured to configure, condition, and/or amplify an electrical signal 214 into a modified electrical signal (e.g., an amplified electrical signal) for the CDR circuit 206. For example, the driver 208 can be configured to generate a differential output voltage and/or an amplified output voltage (e.g., based on the electrical signal 214) for the CDR circuit 206. In certain embodiments, the driver 208 can be configured to provide gain control for the electrical signal 214. In certain embodiments, the driver circuit 208 can be a differential driver circuit. In certain embodiments, the driver circuit 208 can be an amplifier circuit (e.g., a single-ended amplifier circuit). In certain embodiments, the driver circuit 208 can be a conditioning circuit.

The CDR circuit 206 can be configured for equalization, re-timing, and/or amplitude adjustment to provide communication data 216. In one or more embodiments, the CDR circuit 206 can perform equalization for the communication data 216 based on a lookup table 207 configured to equalize linear and/or non-linear features for the communication data 216. Furthermore, in one or more embodiments, the CDR circuit 206 can be configured to manage the lookup table 207 associated with equalization of the communication data 216. For example, in certain embodiments, the CDR circuit 206 can be configured to adjust the lookup table 207 for post-equalization of the communication data 216 (e.g., after to the electrical signal 215 is generated based on an optical signal transmitted via an optical communication lane). In another example, in certain embodiments, the CDR circuit 206 can be configured to adjust the lookup table 207 to implement feed-forward equalization of the communication data 216. In certain embodiments, the CDR circuit 207 can be configured to tune one or more feed-forward equalizer coefficients configured by the lookup table 206. In one or more embodiments, the lookup table 207 is embedded in the CDR circuit 206. In an embodiment where the transceiver 200 corresponds to the transceiver 114, the electrical signal 214 can be provided by the transceiver 112 via the electrical communication lane 124. Furthermore, in this embodiment, the communication data 216 can be provided to the end system 104. In one or more embodiments, a value of the communication data 216 provided to the end system 104 can correspond to a value of the communication data 210 provided by the switch 102.

In one or more embodiments, the CDR circuit 206 can be configured to equalize from the end system 104 to the switch 102. For example, in one or more embodiments, the CDR circuit 206 can be configured with a transfer function (e.g., a channel transfer function) to equalize the end-to-end link channel 106 from the end system 104 to the switch. In an embodiment, a transfer function of the CDR circuit 206 can be different than a transfer function of the CDR circuit 202. In an embodiment, a transfer function of the CDR circuit 206 can be approximately equal to a transfer function of the CDR circuit 202. In one or more embodiments, the CDR circuit 206 can be configured for post-equalization of the end-to-end link channel 106 from the end system 104 to the switch 102. In certain embodiments, a degree of pre-equalization provided by the CDR circuit 206 can be determined based on configuration of a tuning mechanism of the CDR circuit 206. For example, the tuning mechanism of the CDR circuit 206 can be configured differently than a tuning mechanism of the CDR circuit 202. Additionally or alternatively, in certain embodiments, a degree of pre-equalization provided by the CDR circuit 206 can be determined based on the lookup table 207 (e.g., a number of taps of the lookup table 207, a number of pre-taps of the lookup table 207, a number of post-taps of the lookup table 207, etc.). In certain embodiments, the number of taps and/or the type of taps of the lookup table 207 can be different than the number of taps and/or the type of taps of the lookup table 203.

In some embodiments, the CDR circuit 206 can be configured to calibrate the lookup table 207. The lookup table 207 can be configured to map one or more input values to an output value. In some embodiments, the lookup table 207 is a hardware-based lookup table circuit embedded in the CDR circuit 206 and controlled by the CDR circuit 206. For example, the lookup table 207 can include one or more hardware gates, one or more hardware latches, one or more hardware relays, and/or one or more other hardware components. In an embodiment, the CDR circuit 206 can tune one or more transitions of the lookup table 207. A transition of the lookup table 207 can include an initial state and an end state. Additionally, in certain embodiments, hardware components of the lookup table 207 can be associated with corresponding transitions. For example, in certain embodiments, a transition of the lookup table 207 can include one or more interconnections and/or one or more hardware components. In another embodiment, a weight of one or more hardware components of the lookup table 207 can be tuned by the CDR circuit 206. For instance, a weight of one or more hardware components of the lookup table 207 can be repeatedly tuned until the communication data 216 satisfies a defined quality criterion.

In some embodiments, the CDR circuit 206 can utilize the lookup table 207 to generate the communication data 216 based on the electrical signal 214. In some embodiments, the lookup table 207 may be configured to perform equalization. For example, in some embodiments, the lookup table 207 may also be configured to take into account equalization of the communication data 216 (such as by having the lookup table values adjusted to take equalization into account). In some embodiments related to equalization, an input value of the lookup table 207 can be weighted to match a desired output value that contains an equalization factor. The lookup table 207 may additionally or alternatively, in some cases, be used to implement different coding, such as Costa precoding, Tomlinson-Harashima precoding, Gray coding, or the like. In some embodiments, one or more signal parameters of the communication data 216, such as a symbol duration, an amplitude, or other signal parameters are adjusted based on the lookup table 207. In another embodiment related to coding, an input value of the lookup table 207 can be weighted based on a digital value associated with the coding. For example, in certain embodiments, an input value of the lookup table 207 can be weighted based on a digital value associated with Costa precoding, a digital value associated with Tomlinson-Harashima precoding, or a digital value associated with Gray coding.

FIG. 3 illustrates a block diagram of an example transceiver 300 according to one or more embodiments of the present disclosure. The transceiver 300 can correspond to the transceiver 110 and/or the transceiver 112. The transceiver 300 includes a driver circuit 302, a laser source 304, a TIA 306 and/or a photodiode 308. In certain embodiments, the transceiver 300 can be configured for M lanes, where M is an integer. Furthermore, each lane of the transceiver 300 can include and/or can be configured to employ the driver circuit 302, the laser source 304, the TIA 306 and/or the photodiode 308.

The driver circuit 302 can be communicatively coupled to a transceiver (e.g., the transceiver 200). For example, the driver circuit 302 can be communicatively coupled to the driver circuit 204 via an electrical communication lane (e.g., the electrical communication lane 116 or the electrical communication lane 124). Furthermore, the driver circuit 302 can receive an electrical signal 310. In an embodiment, the electrical signal 310 can correspond to the electrical signal 212 provided by the driver circuit 204. In one or more embodiments, the driver circuit 302 can be configured to modulate the laser source 304 based on the electrical signal 310 to generate an optical signal 312 via the laser source 304. The optical signal 312 can be transmitted via the optical communication lane 120. In an embodiment in which the transceiver 300 corresponds to the transceiver 110, the electrical signal 310 can be provided by the transceiver 108. Furthermore, in this embodiment, the optical signal 312 can be transmitted to the transceiver 112 via the optical communication lane 120.

The laser source 304 can include one or more optical sources. For instance, in one or more embodiments, the laser source 304 can include at least one vertical cavity surface emitting laser (VCSEL), at least one externally modulated laser (EML), and/or at least one electro-absorption modulator, or a directly modulated laser (DML). In one or more embodiments, the laser source 304 can be configured to facilitate communication of the optical signal 312. In an embodiment, the laser source 304 can be configured to emit the optical signal 312. The optical signal 312 can be, for example, an optical signal associated with communication data for transmission via the optical communication lane 120. For example, in one or more embodiments, the optical signal 312 can be an electromagnetic signal that transmits data at 10G, 25G, 40G, 50G, 100G, 200G, 400G or another data speed via the optical communication lane 120. In one or more embodiments, the laser source 304 can emit the optical signal 312 at a particular wavelength (e.g., 850 nm or another wavelength).

In certain embodiments, the laser source 304 is a semiconductor laser diode that emits the optical signal 312 vertically with respect to a top surface of the laser source 304. For example, in one or more embodiments, the laser source 304 can include a set of mirrors (e.g., a set of distributed Bragg reflector mirrors) parallel to a wafer surface, one or more oxide layers, a gain region, and/or a laser cavity (e.g., an active region) to facilitate generation of a laser light for the optical signal. In one or more embodiments, the set of mirrors (e.g., the set of distributed Bragg reflector mirrors) of the laser source 304 can include a set of layers with alternating high refractive indices and low refractive indices to facilitate generation of a laser light for the optical signal. In a non-limiting example, the laser source 304 can be associated with 4$x$ fiber channel data links. In certain embodiments, an optical path of the optical signal 312 can include a mirror to facilitate transmission of the optical signal 312 via the optical communication lane 120. For example, in one or more embodiments, the mirror can be an optical path component (e.g., a reflective surface) that redirects and/or guides the optical signal 312 to the optical communication lane 120. In one or more embodiments, the optical communication lane 120 can be one or more optical fibers (e.g., one or more transparent fiber optic connections, one or more fiber optic wires, etc.) that transmit pulses of infrared light. In an embodiment, the optical communication lane 120 can include a first fiber optic wire for transmission of optical signals and a second fiber optic wire for reception of optical signals.

The photodiode 308 can be configured to generate an electrical signal based on an optical signal 314. In an embodiment where the transceiver 300 corresponds to the transceiver 112, the optical signal 314 can correspond to the optical signal 312 provided by the laser source 304 of the transceiver 110. In one or more embodiments, the electrical signal generated by the photodiode 308 based on the optical signal 314 can be a current signal that is converted by the TIA 306 into the electrical signal 316. For example, the TIA 306 can be configured to convert a current associated with the electrical signal generated by the photodiode 308 into a differential voltage represented by the electrical signal 316. In an embodiment in which the transceiver 300 corresponds to the transceiver 112, the electrical signal 316 can be provided to the transceiver 114 via the electrical communication lane 124. Furthermore, in an embodiment where the transceiver 300 corresponds to the transceiver 112, the electrical signal 316 can correspond to the electrical signal 214 received by the driver 208.

FIG. 4 illustrates an example block diagram of the end-to-end link channel 106 according to one or more embodiments of the present disclosure. For instance, the end-to-end link channel 106 illustrated in FIG. 4 can be an example end-to-end link channel between the switch 102 and the end system 104. In one or more embodiments, a chain of processing blocks for the end-to-end link channel 106 includes the CDR circuit 202 and the driver circuit 204 of the transceiver 108, the driver circuit 302 and the laser source 304 of the transceiver 110, the photodiode 308 and the TIA 306 of the transceiver 112, and the driver 208 and the CDR circuit 206 of the transceiver 114 to facilitate transmission of communication data between the switch 102 and the end system 104. As such, as compared to a conventional chain of processing blocks with a greater number of processing blocks (e.g., a greater number of CDR circuits) between a switch and an end system, the end-to-end link channel 106 can provide a reduction in latency and power consumption with respect to transmission of communication data.

FIG. 5 illustrates an example block diagram of an equalization channel 500 provided by the end-to-end link channel 106 according to one or more embodiments of the present disclosure. For instance, in one or more embodiments, a chain of processing blocks for the end-to-end link channel 106 includes the CDR circuit 202 and the driver circuit 204 of the transceiver 108, the driver circuit 302 and the laser source 304 of the transceiver 110, the photodiode 308 and the TIA 306 of the transceiver 112, and the driver 208 and the CDR circuit 206 of the transceiver 114 to facilitate transmission of communication data between the switch 102 and the end system 104. Therefore, the end-to-end link channel 106 can provide a single equalization channel (e.g., the equalization channel 500) associated with the driver circuit 204 of the transceiver 108, the driver circuit 302 and the laser source 304 of the transceiver 110, the photodiode 308 and the TIA 306 of the transceiver 112, and the driver 208 of the transceiver 114.

Conventionally, an end-to-end link channel between a switch and an end system utilizes two or more additional CDR circuits at intermediate interfaces between processing components such that a conventional end-to-end link channel contains three or more different channels that require equalization. Therefore, a conventional end-to-end link channel generally introduces undesirable overhead, as each CDR circuit is generally configured to determine optimal points to equalize respective channels, resulting in additional utilization of power and/or additional latency for the end-to-end link channel.

Accordingly, because the end-to-end link channel 106 only includes two CDR circuits, the end-to-end link channel 106 is reduced to a single channel as compared to conventional end-to-end link channels. With the end-to-end link channel 106, the CDR circuit 202 can adjust the lookup table 203 to have optimal feed-forward equalizer tap values for pre-equalization. Furthermore, the CDR circuit 206 can adjust the lookup table 207 to have optimal FFE tap values for post-equalization. In certain embodiments, the CDR circuit 206 can further implement a decision feedback equalizer to further improve signal quality for the communication data. The reduction of equalization channels by employing the end-to-end link channel 106 also drastically reduces processing complexity. Furthermore, the end-to-end link channel 106 can provide improved equalization as compared to conventional end-to-end link channels. In addition, since the CDR circuit 202 and the CDR circuit 206 are based on lookup tables, one or more coding techniques (e.g., Tomlinson-Harashima precoding, Costa precoding, Gray coding, etc.) that introduce negligible or zero overhead can be implemented in order to further improve the signal-to-noise ratio.

FIG. 6 illustrates an example lookup table 600 with two input symbols. The two input symbols, main symbol N and a pre-cursor, are each comprised of a least significant bit and a most significant bit and an output of M bits. It is to be appreciated that the lookup table 600 may have more than two input symbols with different numbers of pre-cursor symbols and post-cursor symbols. The M bits may be used as an input to a digital-to-analog converter. In an embodiment, the lookup table 600 can correspond to the lookup table 203 and/or the lookup table 207.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

FIG. 7 is a flowchart illustrating an example method 700 for facilitating an end-to-end link channel with one or more lookup tables for equalization in accordance with one or more embodiments of the present disclosure. It will be understood that each block of the flowcharts, and combinations of blocks in the flowcharts, may be implemented by various means. In some example embodiments, certain ones of the operations herein may be modified or further amplified as described below. Moreover, in some embodiments additional optional operations may also be included. It should be appreciated that each of the modifications, optional additions, or amplifications described herein may be included with the operations herein either alone or in combination with any others among the features described herein. The operations illustrated in FIG. 7 may, for example, be performed by an example computing system 800 (shown in FIG. 8) that is embedded in a network interface module, a transceiver (e.g., the transceiver 108, the transceiver 110, the transceiver 112, the transceiver 114, the transceiver 200, and/or the transceiver 300), a laser source (e.g., the laser source 304), and/or an integrated circuit. In some embodiments, the computing system 800 is a firmware computing system embedded in a network interface module, a transceiver (e.g., the transceiver 108, the transceiver 110, the transceiver 112, the transceiver 114, the transceiver 200, and/or the transceiver 300), a laser source (e.g., the laser source 304), and/or an integrated circuit. In one or more embodiments, one or more of the operations illustrated in FIG. 7 may, for example, be performed by a network interface module, a transceiver (e.g., the transceiver 108, the transceiver 110, the transceiver 112, the transceiver 114, the transceiver 200, and/or the transceiver 300), a laser source (e.g., the laser source 304), and/or an integrated circuit. In one or more embodiments, at operation 702, the computing system 800 performs, via a first clock data recovery (CDR) circuit of a first transceiver, a first equalization process with respect to communication data. In one or more embodiments, at operation 704, the computing system 800 transmits the communication data via an electrical communication lane and an optical communication lane. In one or more embodiments, at operation 706, the computing system 800 performs, via a second CDR circuit of a second transceiver, a second equalization process with respect to the communication data. In some embodiments, performing the first equalization process comprises performing pre-equalization of the communication data prior to the transmitting of the communication data via the electrical communication lane and the optical communication lane. In some embodiments, performing the second equalization process comprises performing post-equalization of the communication data after transmitting of the communication data via the electrical communication lane and the optical communication lane.

FIG. 8 illustrates the computing system 800 that may be embedded in a computer network system. In some cases, the computing system 800 may be a firmware computing system communicatively coupled with, and configured to control, one or more circuit modules associated with a network interface module (e.g., a QSFP network interface module, an optical transceiver module, etc.). For example, the computing system 800 may be a firmware computing system and/or a controller computing system communicatively coupled with one or more circuit modules, such as a network interface module, a transceiver (e.g., the transceiver 108, the transceiver 110, the transceiver 112, the transceiver 114, the transceiver 200, and/or the transceiver 300), a laser source (e.g., the laser source 304), and/or an integrated circuit. The computing system 800 may include or otherwise be in communication with a processor 810, memory circuitry 820, and communication circuitry 830. In some embodiments, the processor 810 (which may include multiple or co-processors or any other processing circuitry associated with the processor) may be in communication with the memory circuitry 820. The memory circuitry 820 may comprise non-transitory memory circuitry and may include one or more volatile and/or non-volatile memories. In some examples, the memory circuitry 820 may be an electronic storage device (e.g., a computer readable storage medium) configured to store data that may be retrievable by the processor 810. In some examples, the data stored in the memory 820 may include communication protocol data, or the like, for enabling the apparatus to carry out various functions or methods in accordance with embodiments of the present invention, described herein.

In some examples, the processor 810 may be embodied in a number of different ways. For example, the processor may be embodied as one or more of various hardware processing means such as a microprocessor, a coprocessor, a digital signal processor (DSP), a CPU, a GPU, a controller, or a processing element with or without an accompanying DSP. The processor 810 may also be embodied in various other processing circuitry including integrated circuits such as, for example, an FPGA (field programmable gate array), a microcontroller unit (MCU), an ASIC (application specific integrated circuit), a hardware accelerator, or a special-purpose electronic chip. Furthermore, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining, and/or multithreading. In some embodiments, the processor 810 is a microprocessor.

In an example embodiment, the processor 810 may be configured to execute instructions, such as computer program code or instructions, stored in the memory circuitry 820 or otherwise accessible to the processor 810. Alternatively or additionally, the processor 810 may be configured to execute hard-coded functionality. As such, whether configured by hardware or software instructions, or by a combination thereof, the processor 810 may represent a computing entity (e.g., physically embodied in circuitry) configured to perform operations according to an embodiment of the present invention described herein. For example, when the processor 810 is embodied as an ASIC, FPGA, or similar, the processor may be configured as hardware for conducting the operations of an embodiment of the invention. Alternatively, when the processor 810 is embodied to execute software or computer program instructions, the instructions may specifically configure the processor 810 to perform the algorithms and/or operations described herein when the instructions are executed. However, in some cases, the processor 810 may be a processor of a device (e.g., a mobile terminal or a fixed computing device) specifically configured to employ an embodiment of the present invention by further configuration of the processor using instructions for performing the algorithms and/or operations described herein. The processor 810 may further include a clock, an arithmetic logic unit (ALU) and logic gates configured to support operation of the processor 810, among other things.

The computing system 800 may optionally also include the communication circuitry 830. The communication circuitry may be any means embodied in either hardware or a combination of hardware and software that is configured to receive and/or transmit data from/to a network and/or any other device or module in communication with the computing system 800. In this regard, the communication interface may include, for example, supporting hardware and/or software for enabling communications. As such, for example, the communication circuitry 830 may include a communication modem and/or other hardware/software for supporting communication via cable, universal serial bus (USB), integrated circuit receiver, or other mechanisms.

Many modifications and other embodiments of the present inventions set forth herein will come to mind to one skilled in the art to which these inventions pertain having the benefit of the teachings presented in the foregoing descriptions and the associated drawings. Therefore, it is to be understood that the present inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A system, comprising:
a first transceiver that comprises:
a clock data recovery (CDR) circuit configured to receive communication data from a switch, and to manage a lookup table for equalization of the communication data; and
a first driver circuit communicatively coupled to the CDR circuit and configured to generate an electrical signal associated with the communication data, wherein the CDR circuit is further configured to tune one or more weights of one or more hardware components of the lookup table such that the communication data satisfies an optical communication quality metric; and
a second transceiver that comprises:
a second driver circuit, communicatively coupled to the first transceiver, that is configured to receive the electrical signal from the first transceiver and to modulate a laser source based on the electrical signal to generate an optical signal via the laser source.

2. The system of claim 1, wherein the CDR circuit is configured to adjust the lookup table for pre-equalization of the communication data.

3. The system of claim 1, wherein the CDR circuit is configured to adjust the lookup table to implement feed-forward equalization of the communication data.

4. The system of claim 1, wherein the CDR circuit is configured to tune one or more feed-forward equalizer coefficients configured by the lookup table.

5. The system of claim 1, wherein the lookup table is embedded in the CDR circuit.

6. The system of claim 1, wherein the second transceiver is attached to a front panel of the switch.

7. The system of claim 1, wherein the laser source is a vertical cavity surface emitting laser.

8. The system of claim 1, wherein the laser source is an externally modulated laser.

9. A system, comprising:
a first transceiver that comprises:
a photodiode configured to generate an electrical signal based on an optical signal; and
a second transceiver that comprises:
a driver circuit communicatively coupled to the first transceiver and configured to receive the electrical signal from the first transceiver and to generate a modified electrical signal based on the electrical signal; and
a clock data recovery (CDR) circuit configured to generate communication data based on the modified electrical signal and to manage a lookup table associated with equalization of the communication data, wherein the CDR circuit is further configured to tune one or more weights of one or more hardware components of the lookup table such that the communication data satisfies an optical communication quality metric.

10. The system of claim 9, wherein the CDR circuit is configured to adjust the lookup table for post-equalization of the communication data.

11. The system of claim 9, wherein the CDR circuit is configured to adjust the lookup table to implement feed-forward equalization of the communication data.

12. The system of claim 9, wherein the CDR circuit is configured to tune one or more feed-forward equalizer coefficients configured by the lookup table.

13. The system of claim 9, wherein the lookup table is embedded in the CDR circuit.

14. The system of claim 9, wherein the CDR circuit is configured to provide the communication data to a switch.

15. The system of claim 9, wherein the CDR circuit is configured to store the communication data in a memory.

16. The system of claim 9, wherein the CDR circuit is configured to provide the communication data to a processing unit.

17. The system of claim 9, wherein the first transceiver comprises:
a transimpedance amplifier (TIA) configured to modify the electrical signal provided by the photodiode, wherein the TIA is communicatively coupled to the second transceiver.

18. A method, comprising:
performing, via a first clock data recovery (CDR) circuit of a first transceiver, a first equalization process with respect to communication data, wherein the first equalization process is performed based on at least a lookup table, wherein the CDR circuit is further configured to tune one or more weights of one or more hardware components of the lookup table such that the communication data satisfies an optical communication quality metric;

transmitting the communication data via an electrical communication lane and an optical communication lane; and performing, via a second CDR circuit of a second transceiver, a second equalization process with respect to the communication data.

19. The method of claim 18, wherein the performing the first equalization process comprises performing pre-equalization of the communication data prior to the transmitting of the communication data via the electrical communication lane and the optical communication lane.

20. The method of claim 18, wherein the performing the second equalization process comprises performing post-equalization of the communication data after the transmitting of the communication data via the electrical communication lane and the optical communication lane.

* * * * *